US 9,323,308 B1

(12) United States Patent
Heath et al.

(10) Patent No.: US 9,323,308 B1
(45) Date of Patent: *Apr. 26, 2016

(54) POWER-CONSUMING FACILITIES AS A SOURCE OF RESERVE POWER

(71) Applicant: Google Inc., Mountain View, CA (US)

(72) Inventors: Taliver Brooks Heath, Mountain View, CA (US); Denton E. Gentry, Fremont, CA (US)

(73) Assignee: Google Inc., Mountain View, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/082,924

(22) Filed: Nov. 18, 2013

Related U.S. Application Data

(63) Continuation of application No. 12/769,723, filed on Apr. 29, 2010, now Pat. No. 8,588,989.

(51) Int. Cl.
*G06F 1/32* (2006.01)
*H02J 3/14* (2006.01)

(52) U.S. Cl.
CPC .............. *G06F 1/3206* (2013.01); *H02J 3/14* (2013.01)

(58) Field of Classification Search
CPC ............ G06F 1/3206; G06F 1/32; H02J 3/14
USPC ............ 700/286, 291, 295, 296, 297; 307/23, 307/29
See application file for complete search history.

(56) References Cited

U.S. PATENT DOCUMENTS

| | | | |
|---|---|---|---|
| 6,624,532 B1 | 9/2003 | Davidow et al. | |
| 6,745,106 B2 | 6/2004 | Howard et al. | |
| 6,861,956 B2 | 3/2005 | Ying | |
| 7,149,605 B2 | 12/2006 | Chassin et al. | |
| 7,236,896 B2 | 6/2007 | Farkas et al. | |
| 7,324,876 B2 | 1/2008 | Ying | |
| 7,560,831 B2 | 7/2009 | Whitted et al. | |
| 7,569,944 B2 | 8/2009 | Oohara et al. | |
| 7,612,466 B2 | 11/2009 | Skutt | |
| 7,680,561 B2 | 3/2010 | Rodgers et al. | |
| 7,715,951 B2 | 5/2010 | Forbes, Jr. et al. | |
| 7,747,357 B2 | 6/2010 | Murdoch | |
| 7,960,857 B2 | 6/2011 | King | |
| 8,008,804 B2 | 8/2011 | Capp et al. | |
| 8,068,938 B2 | 11/2011 | Fujita | |
| 8,080,900 B2 | 12/2011 | Corhodzic et al. | |
| 8,121,743 B2 | 2/2012 | Boss et al. | |
| 8,200,370 B2 | 6/2012 | Paik | |
| 8,588,989 B1 * | 11/2013 | Heath et al. .................. | 700/295 |
| 2005/0012395 A1 | 1/2005 | Eckroad et al. | |
| 2005/0077881 A1 | 4/2005 | Capp et al. | |
| 2007/0005192 A1 * | 1/2007 | Schoettle et al. ............. | 700/286 |

(Continued)

*Primary Examiner* — Charles Kasenge
(74) *Attorney, Agent, or Firm* — Fish & Richardson P.C.

(57) ABSTRACT

A system includes a power-consuming, at least one energy storage device, and a power management system. The facility is configured to receive electrical power from an electric utility grid. The energy storage device is located at the power consuming facility and is configured to store electrical energy from the electrical power received from the electric utility grid. The power management system is configured to receive, from the electric utility grid, a request that indicates an amount of power and, in response to the request, to cause at least a portion of the power-consuming facility to be powered by the at least one energy storage device rather than the power received from the electric utility grid such that an amount of the received power consumed by the power-consuming facility is reduced by at least the indicated amount.

17 Claims, 5 Drawing Sheets

(56) References Cited

U.S. PATENT DOCUMENTS

| | | |
|---|---|---|
| 2008/0030078 A1 | 2/2008 | Whitted et al. |
| 2009/0021078 A1 | 1/2009 | Corhodzic et al. |
| 2009/0062970 A1 | 3/2009 | Forbes, Jr. et al. |
| 2009/0150005 A1 | 6/2009 | Hadar et al. |
| 2009/0206670 A1 | 8/2009 | Whitted et al. |
| 2009/0243517 A1 | 10/2009 | Verfuerth et al. |
| 2009/0248217 A1 | 10/2009 | Verfuerth et al. |
| 2010/0088261 A1 | 4/2010 | Montalvo |
| 2010/0141046 A1 | 6/2010 | Paik |
| 2010/0145884 A1 | 6/2010 | Paik |
| 2010/0211810 A1 | 8/2010 | Zacho |
| 2010/0217452 A1 | 8/2010 | McCord et al. |
| 2010/0314942 A1 | 12/2010 | Talkin et al. |
| 2012/0232712 A1 | 9/2012 | Paik |

* cited by examiner

POWER-CONSUMING FACILITIES AS A SOURCE OF RESERVE POWER

CROSS-REFERENCE TO RELATED APPLICATIONS

This application is a continuation application of and claims priority to U.S. application Ser. No. 12/769,723, filed on Apr. 29, 2010, the entire contents of which are hereby incorporated by reference.

TECHNICAL FIELD

The following disclosure relates to the use of a power distribution architecture for using power-consuming facilities as a source of reserve power for an electric utility grid.

BACKGROUND

The popularity and simplicity of sharing information over networks, such as the Internet, has resulted in demand for data processing and storage capacity to support high network traffic volume. One mechanism to address this need may be referred to as a data center. In the context of the Internet, a data center may provide processing, storage, and support functions that improve performance or enhance the utility of the Internet. Data centers may also be deployed in other contexts. Financial institutions, for example, may employ one or more data centers to store financial account and transaction information. In general, data centers employ multiple computing nodes that use power supplied from the electric utility grid.

SUMMARY

In one aspect, a system includes a power-consuming, at least one energy storage device, and a power management system. The facility is configured to receive electrical power from an electric utility grid. The energy storage device is located at the power consuming facility and is configured to store electrical energy from the electrical power received from the electric utility grid. The power management system is configured to receive, from the electric utility grid, a request that indicates an amount of power and, in response to the request, to cause at least a portion of the power-consuming facility to be powered by the at least one energy storage device rather than the power received from the electric utility grid such that an amount of the received power consumed by the power-consuming facility is reduced by at least the indicated amount.

Implementations may include one or more of the following features. For example, the indicated amount of power may be equal to an amount of power needed to maintain a grid frequency of the electric utility grid at a predetermined value. The power-consuming facility may be a computer data center. The power-consuming facility may include multiple computing devices and, to cause at least a portion of the power-consuming facility to be powered by the at least one energy storage device rather than the power received from the electric utility grid, the power management system may be configured to determine one or more of the computing devices that will consume at least the indicated amount of power and cause at least some of the determined computing devices to be powered by the energy storage device rather than the power received from the electric utility grid. The power management system may be configured to determine an amount by which power consumed by the power-consuming facility can be reduced, and send a message to the electric utility grid indicating the amount of by which power consumed by the power-consuming facility can be reduced.

The energy storage device may include multiple energy storage devices, each of the energy storage devices being connected to a computing device such that the power management system is able to cause the computing device to be powered by the energy storage device rather than the power received from the electric utility grid. To cause at least a portion of the power-consuming facility to be powered by the energy storage device rather than the power received from the electric utility grid, the power management system may be configured to determine a set of the computing devices that will consume at least the indicated amount of power and cause at least some of the computing devices in the set to be powered by the connected energy storage devices rather than the power received from the electric utility grid. To determine the set of computing devices that will consume at least the indicated amount of power, the power management system may be configured to determine a set of computing devices that will consume an amount of power in excess of the indicated amount of power, the amount of power in excess of the indicated amount of power being based on an expected failure rate of the energy storage devices. To determine the set of the computing devices that will consume at least the indicated amount of power, the power management system may be configured to determine a set of computing devices that will consume at least the indicated amount of power based on one or more models of power consumed by the computing devices for a given utilization. To determine an amount by which power consumed by the power-consuming facility can be reduced, the power management system may be configured to determine which of the computing devices can be powered by the connected energy storage device because the computing devices are not needed to perform scheduled operations and the connected energy storage device does not need to be recharged.

In another aspect, a method includes receiving electrical power at a power-consuming facility from an electric utility grid; storing energy from the received power in at least one energy storage device located at the power consuming facility; receiving, from the electric utility grid, a request that indicates an amount of power; and in response to the request, causing at least a portion of the power-consuming facility to be powered by the at least one energy storage device rather than the power received from the electric utility grid such that an amount of the received power consumed by the power-consuming facility is reduced by at least the indicated amount.

Implementations may include one or more of the following features. The indicated amount of power may be equal to an amount of power needed to maintain a grid frequency of the electric utility grid at a predetermined value. The power-consuming facility may be a computer data center. The power-consuming facility may include multiple computing devices and causing at least a portion of the power-consuming facility to be powered by the at least one energy storage device rather than the power received from the electric utility grid may include determining one or more of the computing devices that will consume at least the indicated amount of power and causing at least some of the determined computing devices to be powered by the energy storage device rather than the power received from the electric utility grid.

The energy storage device may include multiple energy storage devices, each of the energy storage devices being connected to a computing device such that causing at least a portion of the power-consuming facility to be powered by the at least one energy storage device comprises causing the computing device to be powered by the energy storage device rather than the power received from the electric utility grid. Causing at least a portion of the power-consuming facility to be powered by the at least one energy storage device rather than the power received from the electric utility grid may include determining a set of the computing devices that will consume at least the indicated amount of power and causing at least some of the computing devices in the set to be powered by the connected energy storage devices rather than the power received from the electric utility grid. Determining the set of computing devices that will consume at least the indicated amount of power may include determining a set of computing devices that will consume an amount of power in excess of the indicated amount of power, the amount of power in excess of the indicated amount of power being based on an expected failure rate of the energy storage devices. Determining the set of the computing devices that will consume at least the indicated amount of power may include determining a set of computing devices that will consume at least the indicated amount of power based on one or more models of power consumed by the computing devices for a given utilization. Determining an amount by which power consumed by the power-consuming facility can be reduced may include determining which of the computing devices can be powered by the connected energy storage device because the computing devices are not needed to perform scheduled operations and the connected energy storage device does not need to be recharged.

The method may further include determining an amount by which power consumed by the power-consuming facility can be reduced, and sending a message to the electric utility grid indicating the amount of by which power consumed by the power-consuming facility can be reduced.

In yet another aspect, a system includes a power-consuming facility configured to receive electrical power from an electric utility grid and to receive, from the electric utility grid, a request for an amount of additional power for the electric utility grid and a means for reducing an amount of the received power consumed by the power-consuming facility by at least the requested amount.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
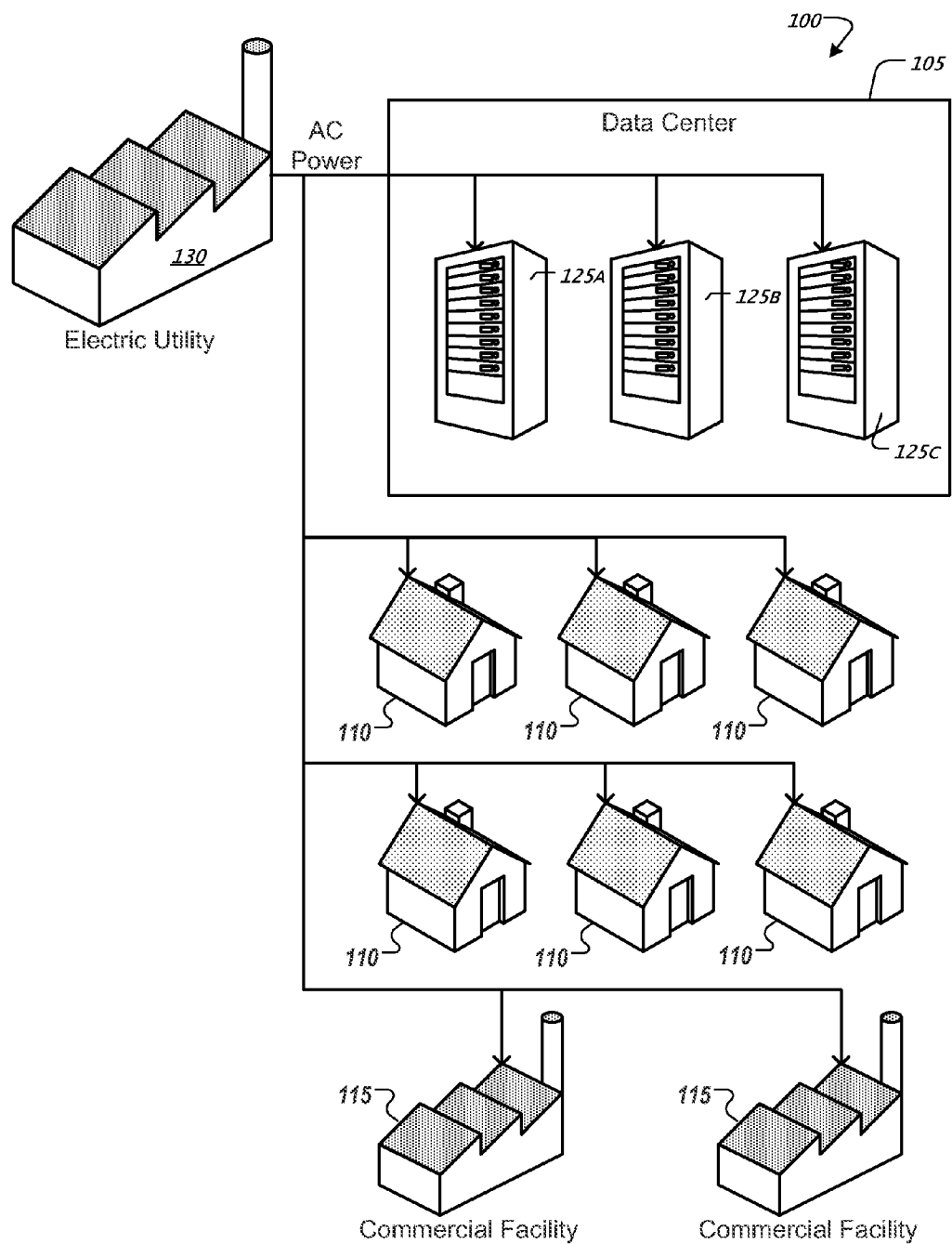
FIG. 1 is a schematic diagram illustrating an example of a power distribution architecture for the distribution of electrical power to consumers, including a data center.

FIG. 1 is a schematic diagram illustrating an example of a power distribution architecture 100 for the distribution of electrical power to consumers, including a computer data center 105. The power distribution architecture 100 includes the computer data center 105, a collection of structures 110 (e.g., homes, businesses, schools), and a collection of commercial facilities 115 (e.g., factories, refineries, airports, stadiums). The computer data center 105, the structures 110, and commercial facilities 115 consume electric energy (e.g., AC power) supplied by an electric utility 130.

In general, the electric utility 130 is responsible not only for generating and for distributing alternating current (AC) electrical power, but also for maintaining the quality of that electrical power. AC power is typically generated using rotary generators to create a stable line frequency, which is typically 60 Hz in the United States. Sudden increases in electrical loads can affect the rotary speed of generators, thereby causing the AC frequency of the power they produce to vary until the electric utility 130 can bring additional generating capacity online to satisfy the increased demand.

Bringing additional generating capacity online, however, may require time. In some situations, additional generating capacity may be available by increasing the power output of the generators already connected to the power system by increasing the torque applied to the generator's rotor. This additional capacity is sometimes referred to as "spinning reserve." In other situations, a supplemental reserve of extra generating capacity may be provided with non-spinning generators that may be brought online. It may take seconds to minutes (or longer) to adjust and stabilize a spinning reserve, or to bring a supplemental reserve online, during which time the grid frequency can remain in a deteriorated state.

One way to reduce the amount of time needed to bring a supplemental reserve online is to keep one or more supplemental generators spinning and synchronized with but disconnected from the grid. Since this generating capacity is kept available offline, it may only take moments for the electric utility 130 to bring that additional capacity online and restore the grid frequency. Having such spinning supplemental generating capacity generally comes with associated operational costs (e.g., fuel, maintenance, personnel) that can increase the cost of power for consumers, reduce the power utilities' profits, and waste natural resources such as coal and natural gas fuels.

One solution that can provide additional reserve power to the power utility is to use electrical energy stored in the computer data center 105. Such energy is typically stored in the computer data center 105 to provide backup power for the computer data center's operations in the event of a power outage (e.g., a blackout) or sag (e.g., a brownout). Such electrical energy may be made available to the electric utility 130 quickly by switching at least some of the computer data center's 105 operations over to use stored power, thus reducing the computer data center's 105 power consumption for a period during which the electric utility 130 may readjust its generating capacity to stabilize the grid frequency. In some implementations, the computer data center 105 may be able to reduce its power consumption quickly, possibly more quickly than offline generators or even spinning reserves may be activated, while avoiding the overhead expenses associated with operating supplemental generators.

In some implementations, making such stored power available to the electric utility 130 may hold benefits for both the electric utility 130 and the computer data center 105. Most apparently, the operators of the computer data center 105 may be able to negotiate a financial arrangement with the electric utility 130, wherein the computer data center 105 may receive payment for making its stored power available for stabilizing the grid frequency, while the electric utility 130 may be able to reduce or eliminate the need for some forms of additional generating capacity and better maintain the quality of the power on the grid. In another example, the computer data center 105 may selectively use stored energy while testing energy storage systems (e.g. to proactively check for components that may fail under use or to estimate storage capacity as components age) or while performing maintenance on the energy storage systems (e.g., periodically "exercising" rechargeable batteries to reduce memory effects). In some implementations, these testing or maintenance operations may be performed as part of making additional power available to the electric utility 130, thereby potentially causing such routine operations to at least partly become sources of revenue for the computer data center 105.

In the case of the computer data center 105, the AC power is at least partly used to operate a number of racks 125A, 125B, and 125C. Each of the racks may 125A-125C include a number of modular rack-mounted bases (which may also be referred to as trays). A tray may include an uninterruptible power supply (UPS) and a computer motherboard. Examples of racks that may be used as the racks 125A-125C will be discussed with respect to FIG. 2.

The power load created by the computer data center 105, the structures 110, and the commercial facilities 115 typically varies gradually from hour to hour, or day to day. For example, air conditioners may increase the use of electricity during a hot summer day, and lessen at night as outside temperatures cool. The electric utility 130 typically senses or anticipates these changes in electrical load, and adjusts the output of its generators to satisfy the demand. In some situations, however, changes in electrical load may occur more rapidly than the electric utility 130 can anticipate or accommodate. For example, a failure of a generator or a transmission line can place a sudden and unexpected load upon the remaining operational generators. When an AC generator becomes overloaded, the generator's rotational speed may be slowed thereby causing the line frequency of the power the generator produces to be negatively affected until the generator's rotary torque can be increased or additional generators can be brought online to satisfy the additional electrical load and maintain a grid frequency of the electric utility grid at a predetermined value.

Figure 2:
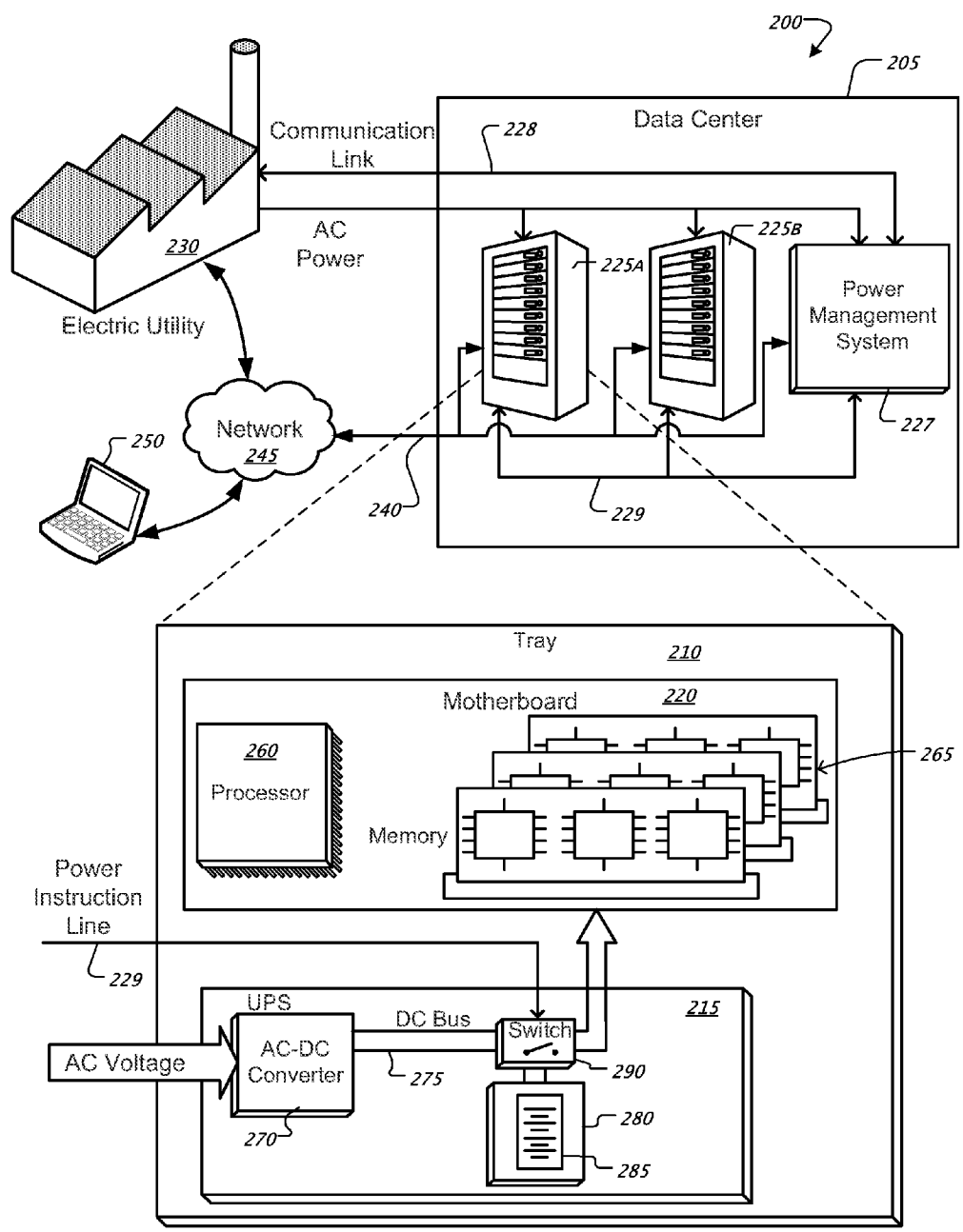
FIG. 2 is a schematic diagram illustrating an example of a power distribution architecture in which a data center can be called upon to provide spinning reserve power to the electric utility grid.

FIG. 2 is a schematic diagram illustrating an example of a power distribution architecture 200 in which a computer data center 205 can be called upon to provide spinning reserve power to the electric utility grid. The system 200 includes a number of modular rack-mounted trays 210 that include an uninterruptible power supply (UPS) 215 and a computer motherboard 220.

Efficient power delivery may be achieved by configuring the UPS 215 to perform the only AC-to-DC rectification that occurs between the AC mains power received from the electric utility grid and the DC power consumed by the motherboard 220. In this example, AC mains refers to the AC power source available at the point of use in the computer data center 205. When received in the computer data center 205 at the UPS 215, the AC mains voltage is a substantially sinusoidal AC signal (e.g., 50 Hz, 60 Hz) that was generated, transmitted, and distributed by the electric utility 230. The AC mains input voltage is converted to a single DC voltage on a DC bus that delivers operating power to the motherboard 220. In the event of a fault on the AC mains, a battery circuit 280 including a battery 285 is electrically connected across the DC bus to supply operating power to the motherboard 220.

In the depicted example, the computer data center 205 includes a number of racks 225A, 225B that contain a number of the trays 210. The computer data center 205 also includes a power management system 227 communicably connected to the electric utility 230 by a communication link 228, and communicably connected to the UPS 215 by a power instruction line 229. Using the communication link 228, the electric utility 230 can communicate with the power management system 227 to send requests for reserve power, and to receive acknowledgement and update information from the power management system 227. The power management system 227 can also use the communication link 228 to notify the electric utility 230 of an amount of reserve power available in the computer data center 205. For example, the power management system 227 may provide the electric utility 230 with periodic updates regarding the amount of available reserve power, and the electric utility may use this information when determining how much reserve power to request from the computer data center 205.

In another example, the power management system 227 may use the communication link 228 to respond to requests for reserve power or information about the amount of reserve power available from the computer data center 205. In response to such requests, the power management system 227 may provide acknowledgements of reserve power requests, information that describes the estimated amount of available reserve power, the actual (e.g., measured) amount of reserve power achieved when reserve power is used, information about how long reserve power may be made available, or combinations of these and other kinds of information that can describe reserve power conditions or availability.

Using the power instruction line 229, the power management system 227 can communicate with the UPS 215 to obtain operational information (e.g., capacity, power load, diagnostics, status) or to command the UPS 215 to switch between AC voltage and energy stored in the UPS 215 to power the motherboard 220. In some implementations, the power instruction line 229 may be established using a dedicated (e.g., hard wired) connection between the power management system 227 and the UPS 215, or the power instruction line 229 may be established using a shared communication infrastructure, such as a network connection 240 or an RF network.

In some implementations, the communication link 228 may be a dedicated (e.g., private line, leased line) communication link. For example, the communication link 228 may be a dedicated T1 line, a private satellite uplink, an ATM link, or other communications link that may be substantially used for communications between only the power utility and the power management system 227. In some implementations, the communication link 228 may be established using a public or private network. For example, the communication link 228 may be made over the Internet, a telephone network, a cellular network, or by using RF transceivers. In yet other implementations, the communication link 228 may be established over the utility grid. For example, power line communications may be used to multiplex the communication link 228 as a data signal carried by the AC mains signal.

In the depicted example, electrical power is distributed to each rack 225. In some implementations, the racks 225A-225B may be powered by three phase AC power line voltages that are delivered to the computer data center 205 from an electric utility 230. The AC power line voltages delivered to each of the racks 225A-225B may originate from an AC generator (e.g., operated by the electric utility 230). The AC voltage signals, which are substantially sinusoidal, may be transmitted to a distribution point, such as a substation (not shown) in the utility grid, for example. The power line voltages (e.g., 480 V line-to-line) may be distributed from the substation to the computer data center 205. In the computer data center 205, individual phase voltages (e.g., 208 V line-to-neutral) may be routed to the individual racks 225A-225B. Suitable AC-to-AC transformers (not shown) may be employed, as necessary, to deliver the AC power at a specified AC voltage. For example, step-down transformers may transform AC power from high voltage levels suitable for transmission to levels that can be substantially directly applied to the UPS 215. In some three phase configurations, for example, such transformers may make appropriate transformations between WYE and DELTA connections if required.

Unless otherwise indicated, references to AC voltages are understood to refer to substantially sinusoidal voltages, and voltage amplitudes are understood to refer to root mean square (r.m.s.) values. The utility 230 may deliver substantially symmetric three phase voltages suitable for powering substantially balanced three phase loads.

Each of the trays 210 in the depicted example is coupled to the network connection 240. The network connection 240 provides an information channel to a network 245, which may include, for example, a local area network, virtual private network, wide area network (e.g., the Internet), or a combination of such networks, which may be wired, fiber optic, and/or wireless. A remote computer 250 represents one of many possible devices that could communicate data directly or indirectly with one or more trays 210 to access, store, process, and/or retrieve information using a processor 260 and associated memory 265 on the motherboard 220. In some implementations, additional processors (e.g., servers) may facilitate such communication. For example, the remote computer device 250 may be included in a server, a desktop computer, a laptop computer, and/or a handheld processor-based device. One or more servers may pre- or post-process, supervise, route, and/or balance the flow of data associated with the communication.

In various implementations, the motherboard 220 may include two, three, four, or any other practicable number of processors 260. In some implementations, the motherboard 220 may be replaced with tray of data storage devices (e.g., hard disc drives, flash memory, RAM, or any of these or other types of memory in combination). In such implementations, the data storage devices and the UPS 215 with the battery circuit 280 may be supported on the tray 210. In various implementations, a digital processor may include any combination of analog and/or digital logic circuits, which may be integrated or discrete, and may further include programmable and/or programmed devices that may execute instructions stored in a memory. The memory 265 may include volatile and/or non-volatile memory that may be read and/or written to by the processor 260. The motherboard 220 may further include some or all of a central processor unit(s) (CPU), memory (e.g., cache, non-volatile, flash), and/or disk drives, for example, along with various memories, chip sets, and associated support circuitry.

In some implementations, the motherboard 220 may provide one or more DC-to-DC converters to convert the DC bus voltage to a suitable voltage for operating the circuitry in the motherboard 220. For example, one or more DC-to-DC converters may provide regulated output voltages, which may include, for example, a +3.3 VDC power signal, a +5 VDC power signal, a −5 VDC power signal, a +12 VDC power signal, and a −12 VDC power signal.

In one implementation, the processor 260 and the memory 265 on the motherboard 220 may form at least a part of a processing system configured to handle network operations. As an illustrative example, the motherboard 220 may help to process Internet requests. The motherboard may process information either alone or in combination with other parallel processes running on other processor-based devices, such as one or more other trays 210 in the computer data center 205.

An AC input voltage signal is delivered to each of the trays 210 to be processed by the UPS 215. In some examples, the AC input voltage signal may be received from the AC mains. The UPS 215 includes an AC-to-DC converter 270 that converts the AC input voltage signal to a regulated DC voltage. The converter 270 outputs the regulated DC voltage onto a DC bus 275. In some implementations, the AC-to-DC converter 270 may regulate the DC voltage to a static set point. In some other implementations, the set point may be dynamically determined. The set point, whether dynamic or static, may be based on a characteristic of the battery.

The AC-to-DC converter 270 may maintain voltage regulation on the DC bus 275 when the AC input voltage signal is in a normal range. A normal range for a typical sinusoidal AC signal may be specified in various ways. For example, one or more thresholds may be specified between about 80 V and 500 V for grid frequencies that may be between about 40 Hz and 1000 Hz, such as around 50 Hz, 60 Hz, 100 Hz, 200 Hz, 300 Hz, 400 Hz, or 500 Hz, and up to about 1000 Hz or more.

As an illustrative example, for a 120 V nominal AC input voltage signal, a fault may be identified if the AC peak input voltage falls below a first threshold of 90 V in any half cycle, or if the r.m.s. voltage drops below a second threshold of 100 V for a predetermined amount of time. Fault conditions may include, without limitation, blackouts, brownouts, voltage sags, surges, instabilities related to switchgear operation, or other electrical transient associated with the AC mains. In some implementations, a fault condition may cause or potentially cause improper operation of a processing unit in the DC load, for example, if the AC-to-DC converter 270 is unable to maintain adequate regulation of the voltage on the DC bus 275, and/or to supply sufficient current to operate the DC loads serviced by the DC bus 275.

The power instruction line 229 is delivered to each of the trays 210 to be processed by the UPS 215. The power instruction line 229 communicably connects the UPS 215 to the power management system 227. Using the power instruction line 229, the power management system 227 can communicate with the UPS 215 to control a switch 290. The switch 290 controllably connects the motherboard 220 to receive DC power from either the AC-DC converter 270 or the battery circuit 280. In some implementations, when the switch 290 is configured to power the motherboard 220 from the battery circuit 280, the battery circuit 280 may be substantially disconnected from the AC-DC converter 270. For example, when the motherboard 220 is running off power supplied by the battery circuit 280, the amount of power consumed from the AC voltage input signal may be substantially reduced to zero.

If the AC input voltage signal falls outside of a normal range, such as during a fault condition, the power management system 227 may use the power instruction line 229 to send a signal to some or all of the trays to switch to their corresponding battery circuit 280. Similarly, when a request is received from the electric utility 230 for power, the power management system 227 may use the power instruction line 229 to send a signal to some or all of the trays to switch to their corresponding battery circuit 280.

In response to receiving the signal from the power management system 227, the switch 290 may be configured to connect the battery circuit 280 across the DC bus 275 so that the motherboard 220 operates using power from the battery circuit 280. The battery 285 may continue to provide operating power to the circuits on the motherboard 220 until the battery 285 substantially discharges. The battery circuit 280 may include circuitry capable of controlling the charging and/or discharging of the battery across the DC bus 275 in various operating modes.

In some implementations, the power instruction line 229 may be used by the UPS 215 to provide status information to the power management system 227. For example, the UPS 215 may communicate information regarding the operational state (e.g., on, off, on battery power), voltage levels, current levels, power line frequency, power quality (e.g., noise, stability), battery capacity, battery health, estimated battery run times, or other information that can describe the operational status of the UPS 215.

The electric utility 230 can communicate with the power management system 227 to request a reduction in power consumption. For example, the electric utility 230 may experience an unexpected increase in power load that may negatively impact the AC frequency of the electricity produced by the electric utility 230. In order to quickly reduce the electrical load until additional generating capacity can be brought online, the electric utility 230 can request a load reduction from the computer data center 205. In some implementations, the computer data center 205 can satisfy such a request quickly by using the power management system 227 to selectively switch one or more of the racks 225A-225B from AC voltage over to power supplied by the UPS 215. This may allow the computer data center 205 to temporarily reduce its load to help the electric utility 230 restore the quality of the electric utility grid frequency, and contribute to keeping the electrical load reduced long enough for the electric utility 230 to bring additional generating capacity online. Processes for requesting and granting such reductions in received power are discussed in the descriptions of FIGS. 3 and 4.

In some implementations, the power management system 227 may periodically poll the UPS 215 to determine the amount of reserve power that the UPS 215 can provide. In some implementations, the power management system 227 may periodically communicate the amount of reserve power available in the UPS 215, or the total amount of reserve power available in the computer data center 205, to the electric utility 230 using the communications link 228. For example, by proactively updating the electric utility 230 with information describing the amount of reserve power that is available in the computer data center 205, the electric utility 230 may more quickly determine what combination of corrective actions (e.g., requesting reserve power, switching in reserve generators) may correct a frequency fluctuation most quickly or economically.

Figure 3:
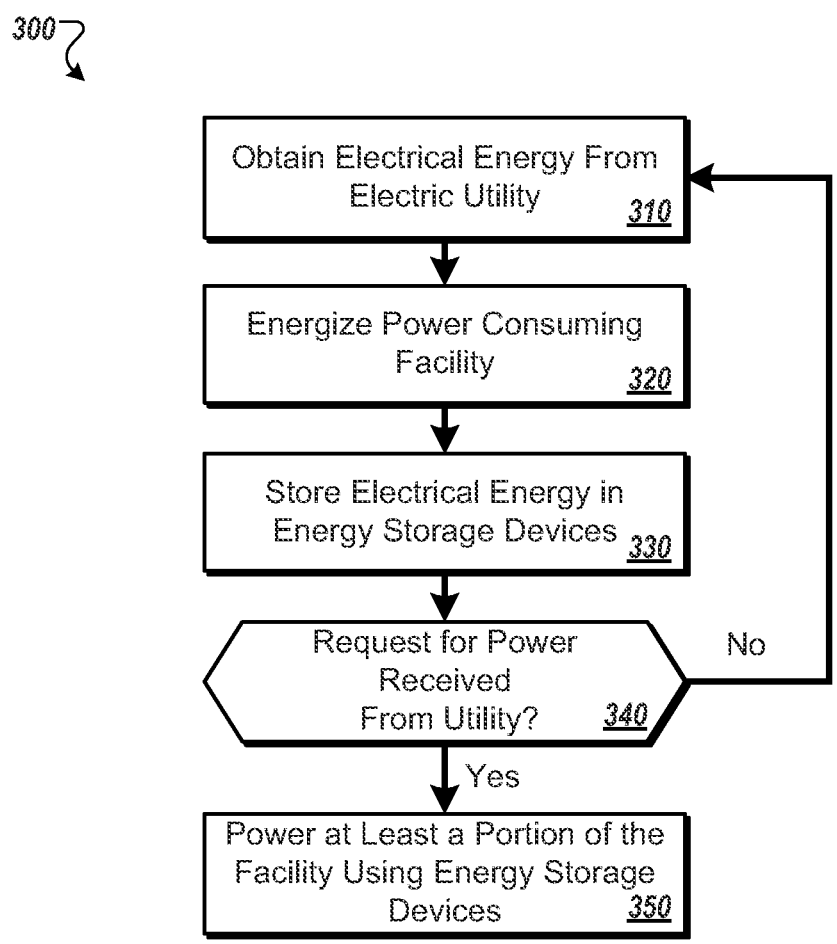
FIG. 3 is a flow diagram illustrating an example of a process that may be performed for using stored electrical energy as a spinning reserve.

FIG. 3 is a flow diagram illustrating an example of a process that may be performed for using stored electrical energy as a spinning reserve. In some implementations, the process 300 may be used by the systems 100 and 200 of FIGS. 1 and 2. The process 300 begins by obtaining electrical energy from an electric utility (310). For example, the electric utility 230 may use generators to energize an electrical grid that carries AC power to various power consuming facilities, such as the computer data center 205, industrial and commercial facilities, and homes. The electrical energy is then used to energize a power consuming facility (320). An example of such a power consuming facility can be the computer data center 205, which may use at least some of the electrical energy produced by the electric utility 230 to energize the trays 210.

At least a portion of the electrical energy is also stored in energy storage devices (330). In some implementations, an example of energy storage devices may be the UPS 215. For example, the computer data center 205 may obtain electrical energy to substantially simultaneously power the racks 225A-225B as well as charge the batteries 285 of the racks. In some implementations, the energy storage devices may store energy in devices other than batteries. For example, electrical energy may be stored using capacitors. In other examples, electrical energy may be reversibly transformed into and stored as thermal, chemical, biological, electrochemical, mechanical, or potential energy. Energy storage devices may include flywheels, thermal reservoirs, compressed air energy storage (CAES) devices, springs, pumped storage devices, molten salt batteries, steam accumulators, or combinations of these or other systems that can store and retrieve electrical energy or electrical energy transformed into another form of energy that may be stored and later transformed back into electrical energy.

In some situations, such as when the electric utility experiences a sudden increase in electrical load, the electric utility may communicate with the power consuming facility to request a reduction in the facility's received power. If no request for power is received from the electric utility (340), then the facility continues to obtain power from the electric utility (310).

If, however, a request for power is received from the utility (340), then the power consuming facility responds by powering at least a portion of the facility using power provided by the energy storage devices (350). For example, the electric utility 230 may use the communications link 228 to issue a request for reserve energy to the power management system 227 in the computer data center 205. In some implementations, the computer data center 205 may respond to such a received request by signaling the UPS 215 to switch from powering the racks 225A-225B with AC power to powering the racks 225A-225B using power stored in the UPS 215 or other energy storage devices. In some implementations, the amount of power reserve power used to power the racks 225A-225B may be equal to the amount of power needed to maintain the frequency of the electric utility grid at a predetermined value (e.g., 60 Hz or 50 Hz).

In some implementations, the power management system 227 may determine one or more of the racks 225A-225B that will consume at least the requested amount of additional power received from the electric utility 230, and cause at least some of the racks 225A-225B to be powered by the UPS 215 rather than by obtaining power from the electric utility 230. For example, the power management system 227 may determine that the rack 225A is consuming 10 kW of power and that the rack 225B is consuming 20 kW of power. If the electric utility 230 requests a 9 kW reduction in received power, then the power management system 227 may power the rack 225A from stored power while keeping the rack 225B operating on AC power; whereas if the power management server 230 receives (340) a request for 18 kW of reserve power, then the rack 225B may configured to be powered from the UPS 215 while the rack 225A operates on AC power.

In some implementations, two or more energy storage devices may be used to at least partly power the facility. Multiple batteries, capacitors, flywheels, or other energy storage devices may be used in combination to power the racks 225A-225B from stored energy rather than from power obtained from the electric utility grid. In some implementations, at least a portion of the power-consuming facility may be powered by the at least one energy storage device rather than the power received from the electric utility grid, and the power management system 227 may be configured to determine a set of computing devices that will consume at least the requested amount of additional power and cause at least some of the computing devices in the set to be powered by the connected energy storage devices rather than the power received from the electric utility grid.

For example, the electric utility 230 may request a 25 kW reduction in power consumption, and the power management system 227 may respond by configuring the racks 225A and 225B to both be powered from stored energy, which may result in a total reduction of 30 kW, which exceeds the 25 kW requested amount of additional power. In use, the requested and available amounts of additional power, and the number and possible combinations of racks may be significantly larger.

Figure 4:
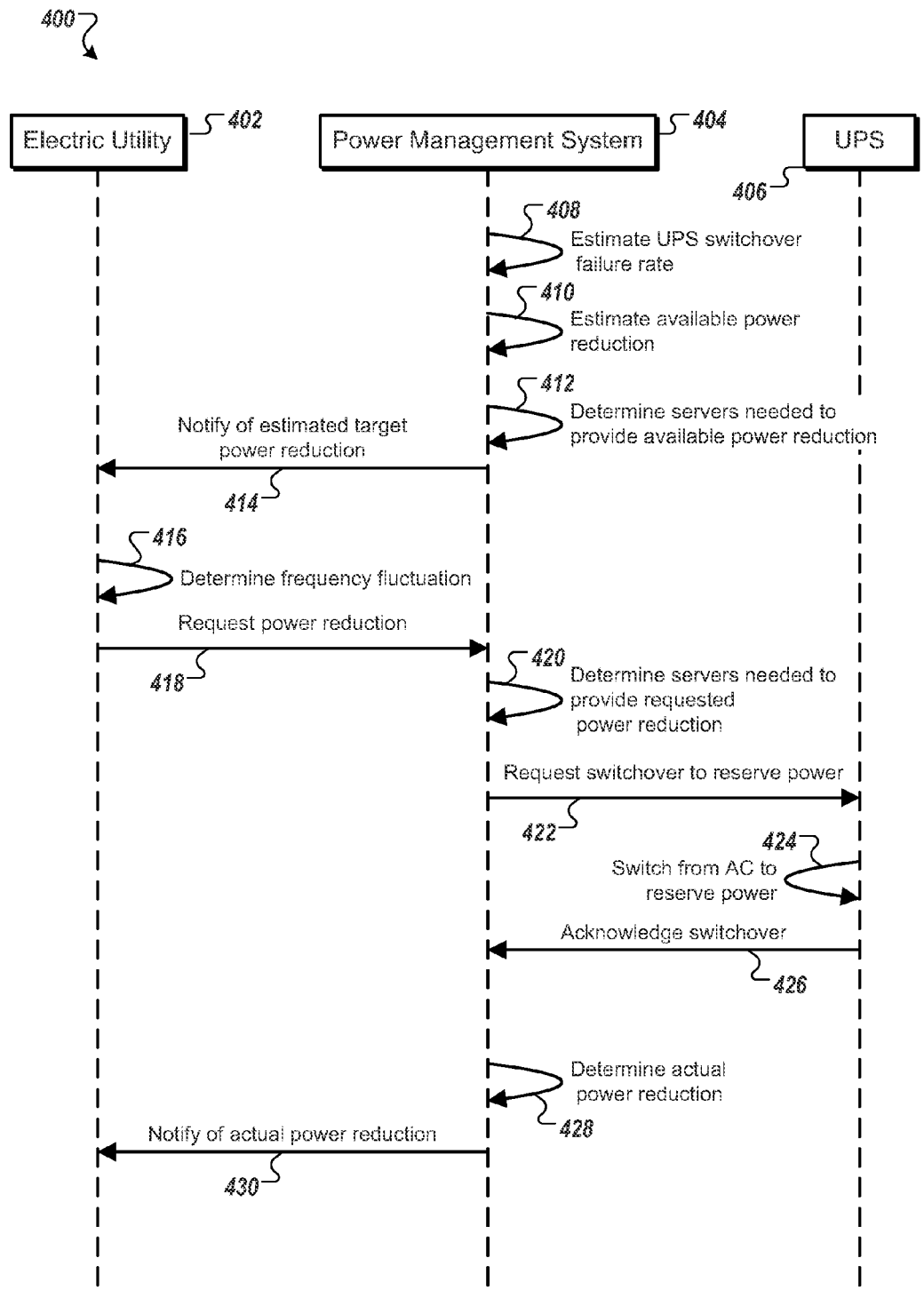
FIG. 4 is a timeline diagram illustrating an example of interactions between a power utility and a data center for using stored energy as reserve power.

FIG. 4 is a timeline diagram illustrating an example of interactions between a power utility and a computer data center for using stored energy as reserve power. More specifically, the electric utility 402 communicates with a power management system 404 within the computer data center. In some implementations, the process 400 may be carried out by the system 200 of FIG. 2. For example, the electric utility 402 may be the electric utility 230, and the power management system 404 may be the power management system 227.

The process 400 begins when the power management system 404 estimates a UPS switchover failure rate (408). In some examples, when the power management system 404 requests a UPS, such as the UPS 406, to switch from energizing power-consuming equipment using AC power to using stored energy, there is a chance that the UPS 406 may not perform the switchover successfully. For example, the UPS 406 may not receive the switchover request due to a communications problem between the power management system 404 and the UPS 406, or the UPS 406 may be experiencing an internal malfunction making the UPS 406 unresponsive (e.g., the internal electronics are "locked up"). In another example, the UPS 406 may determine that switchover requests should be ignored because a detected internal fault (e.g., a bad battery) or a lack of adequate reserve power (e.g., the battery is discharged) may cause equipment drawing power from the UPS 406 to go offline if switched over to reserve power.

The power management system 404 then estimates an available power reduction (410). In some implementations, the power management system 404 may estimate the available power reduction (410) by reading measurements of the amount of power being consumed by devices drawing power from the UPS 406 (e.g., by querying the UPS 406 or by obtaining such measurements from ammeters located at various points around the computer data center).

In other implementations, the power management system 404 may estimate the available power reduction by modeling the power consumption of the devices that draw power from the UPS 406. For example, a server may be estimated to use 200 W when substantially idle (e.g., overhead power needed to energize volatile memory and basic circuitry, to operate cooling fans at their lowest speed), and to use incrementally more power as the server's computing load is increased to its substantially maximum computing capacity in which the server uses 1000 W of power (e.g., when multiple processors are running at full capacity and cooling fans running at full speed).

The power management system 404 may also be capable of estimating the current or anticipated computing loads that the servers may process. For example, historical or statistical data may be used to mathematically project computing loads on a day-to-day or hour-to-hour basis by drawing upon trends observed in the past. In another example, records of scheduled operations may be used as part of a determination that may anticipate the computer data center's computing loads. Estimating the computing loads and the power that may be needed to process the loads permits the power management system 404 to estimate the amount of power that is likely to be consumed by the computer data center.

The available power reduction may be estimated (410) by combining the estimated power consumption of the data center and the estimated UPS switchover failure rate. For example, if the data center's servers are estimated to be drawing 1 MW of power, and the power management system 404 estimates a 10% switchover failure rate, the available power reduction may be estimated to be 1 MW−(1 MW*0.1) or 900 kW.

The power management system 404 then determines the servers needed to provide the available power reduction (412). For example, the power management system 404 may identify the servers not needed to satisfy the current or anticipated computing load, and prioritize those servers as candidates for UPS switchover if needed.

The power management system 404 then notifies the electric utility 402 of the estimated available power reduction (414). In some implementations, the power management system 404 may perform the steps 408-414 on a continual or periodic basis to keep the electric utility notified of the available power reduction that the data center may be able to provide on a substantially real time basis.

At some point in time, the electric utility determines a fluctuation in the frequency of the AC power produced by the electric utility (416). In some implementations, the frequency fluctuation may be caused by a sudden or unexpected increase in the electrical load placed upon the electric utility's generators. The electric utility 402 then requests a power reduction from the power management system 404 (418). In some implementations, the power management system 404 may perform the steps 408-414 in response to receiving the request for a power reduction.

The power management system 404 responds to the request by determining the servers needed to provide the requested power reduction (420). In some implementations, the power management system 404 may be configured to determine a set of computing devices that will consume at least the requested amount of additional power based on one or more models of power consumed by the computing devices for a given utilization. For example, a server may be estimated to use 200 W when substantially idle (e.g., overhead power needed to energize volatile memory and basic circuitry, and to operate cooling fans at their lowest speed), and use incrementally more power as the server's computing load is increased to its substantially maximum computing capacity in which the server uses 1000 W of power (e.g., multiple processors running at full capacity and cooling fans running at full speed).

The power management system 404 may also be capable of estimating the current or anticipated computing loads that the servers may process. For example, historical or statistical data may be used to mathematically project computing loads on a day-to-day or hour-to-hour basis by drawing upon trends observed in the past.

In another example, records of scheduled operations may be used as part of a determination that may anticipate the computer data center's computing loads. In addition, the power management system 227 may take into account the estimated UPS switchover failure rate, and therefore select enough servers to provide the requested power even if some of the UPS switchovers fail. By estimating the computing loads and the power that may be needed to process the loads, the power management system 404 may be able to determine, taking into account the UPS switchover failure rate, a collection of servers that may be switched over to reserve power to satisfy the request for reserve power from the electric utility 402.

In some implementations, the UPS 406 may include multiple energy storage devices (e.g., multiple batteries, capacitors, flywheels, or combinations of these or other energy storage devices), and each of the energy storage devices may be connected to one or more computing devices (e.g., servers) such that the power management system 404 may be able to cause the computing devices to be powered by the energy storage device rather than the power received from the electric utility 402.

Furthermore, the power management system 404 may determine an amount by which power consumed by the power-consuming facility can be reduced, the power management system 404 may be configured to determine which of the computing devices can be powered by the connected energy storage device because the computing devices are not needed to perform scheduled operations and the connected energy storage device does not need to be recharged. For example, once energy storage devices such as the UPS 406 are depleted, they generally either need to consume power from the electric utility 402 to recover, or go offline taking their respective servers offline as well.

The power management system 404 then requests the UPS 406 to switch over from AC voltage to reserve (e.g., battery) power (422). In some implementations, the request may be communicated using the power instruction line 229. In response, the UPS 406 switches from AC power to reserve power (424) to energize the equipment connected to the UPS, such as the racks 225A-225B. The UPS 406 then acknowledges the switchover to the power management system 404 (426).

The power management system 404 uses the acknowledgement received from the UPS (or more typically the acknowledgements received from multiple UPSs) to determine an actual power reduction that has been achieved (428). For example, the power management server 404 may calculate a total of the estimated or measured power consumed by the servers connected to UPSs that have acknowledged successful switchovers.

In some implementations, the power management system 404 may determine that alternative servers need to be determined (420) to provide the requested power reduction. For example, some UPSs may refuse or fail to respond to the switchover request and may continue to draw AC voltage. The power management system 404 may then determine additional servers needed to provide the requested power reduction not satisfied by the failed UPSs.

For example, assume that the electric utility has requested a 1 MW power reduction and the power management system 404 has identified and requested switchover to stored power by eleven UPSs that each provide 100 kW (i.e., 1.1 MW total). However, if two of those UPSs fail to switch over (e.g., 200 kW continues to be drawn from AC power), the data center may only reduce its power consumption by 900 kW. The power management system 404 may then identify an additional two 100 kW UPSs to compensate for the two units that failed to switch over, and therefore ensure that the 1 MW total power reduction originally requested is provided.

The power management system 404 then notifies the electric utility 402 of the actual power reduction (430). In some implementations, the electric utility 402 may use the information provided in the notification to take additional actions to remedy the determined frequency fluctuation. For example, the electric utility 402 may determine that additional power reductions may need to be requested from additional data centers or other sources of reserve power.

In some examples, the power management system 404 may determine that not all of the computer data center's servers are needed to satisfy the present or anticipated computing load. For example, the power management system 404 may allow the unneeded servers to run at their substantially minimum power and computing capacities (e.g., running idle), or the power management system 404 take unneeded servers completely offline to reduce their power consumption. In such examples, the power management system 404 may allow a first server or group of servers to handle a computing load using stored energy until their respective UPSs are substantially depleted, and then transfer that computing load to one of the substantially idle servers or groups of servers to continue operating using stored energy while the first server or group of servers go offline and remain offline (e.g., so as to not consume AC power to recharge their energy storage devices). This process of selectively depleting subgroups of energy storage devices may continue until the electric utility 402 indicates that the reduction in power consumption is no longer needed or until the reserve power available in the computer data center is substantially depleted, at which time the power management system 404 may switch at least some of the servers to operate using AC power from the electric utility 402, and/or recharge at least some of the energy storage devices such as the UPS 406.

Figure 5:
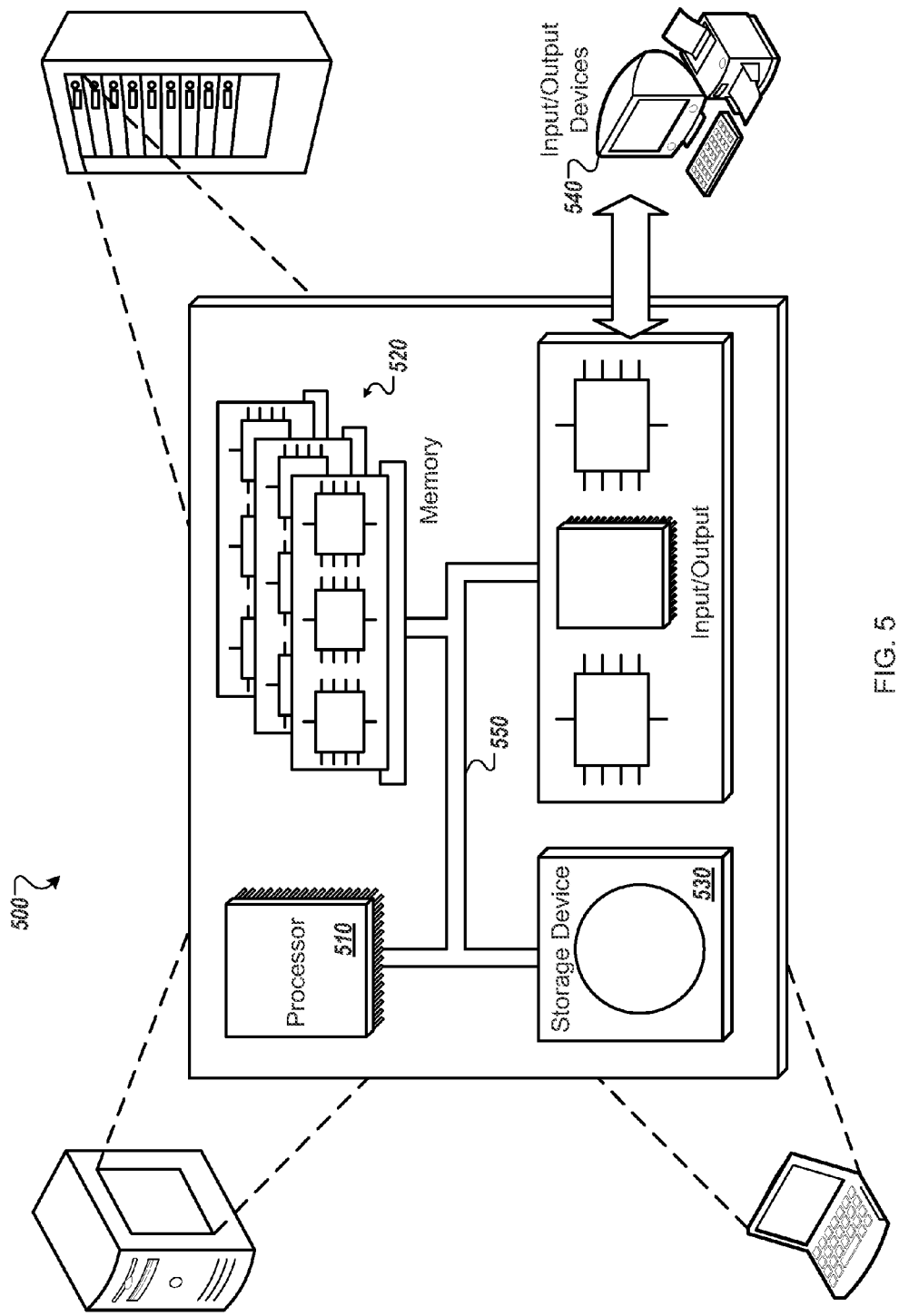
FIG. 5 is a schematic diagram of an example of a generic computer system.

FIG. 5 is a schematic diagram of an example of a generic computer system 500. The system 500 can be used for the operations described in association with the methods 300 or 400 according to various implementations. For example, the system 500 may be included in either or all of the tray 210, the power management system 227, the computer 250, and the racks 125A-125C.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although exemplary implementations have been described with reference to the figures, other implementations are possible. A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A system comprising:
    a power-consuming facility configured to receive electrical power from an electric utility grid;
    at least one energy storage device located at the power-consuming facility, the energy storage device comprising multiple energy storage devices configured to store electrical energy from the electrical power received from the electric utility grid and connect to computing devices such that a power management system is able to cause one or more of the computing devices to be powered by the energy storage devices; and,
    the power management system configured to:
        identify a collection of the computing devices that are not needed to perform scheduled operations;
        determine a first amount of power consumed by the collection of the computing devices;
        identify a collection of the connected energy storage devices that do not need to be recharged;
        determine a second amount of power consumed by the collection of the connected energy storage devices;
        determine a third amount of power by which power consumed by the power-consuming facility can be reduced based on the first amount and the second amount; and
        send a message based on the determined third amount of power by which power consumed by the power-consuming facility can be reduced.

2. The system of claim 1, wherein the power management system is further configured to receive an indication of an amount of power and, in response to the indication, cause at least a portion of the power-consuming facility to be powered by the at least one energy storage device rather than the power received from the electric utility grid such that an amount of the received power consumed by the power-consuming facility is reduced by at least the indicated amount.

3. The system of claim 2 wherein the indicated amount of power is equal to an amount of power needed to maintain a grid frequency of the electric utility grid at a predetermined value.

4. The system of claim 1 wherein the power-consuming facility is a computer data center.

5. The system of claim 2 wherein the power-consuming facility comprises multiple computing devices and, to cause at least a portion of the power-consuming facility to be powered by the at least one energy storage device rather than the power received from the electric utility grid, the power management system is configured to determine one or more of the computing devices that will consume at least the indicated amount of power and cause at least some of the determined computing devices to be powered by the energy storage device rather than the power received from the electric utility grid.

6. The system of claim 2 wherein, to cause at least a portion of the power-consuming facility to be powered by the at least one energy storage device rather than the power received from the electric utility grid, the power management system is configured to determine a set of the computing devices that will consume at least the indicated amount of power and cause at least some of the computing devices in the set to be powered by the connected energy storage devices rather than the power received from the electric utility grid.

7. The system of claim 6 wherein, to determine the set of computing devices that will consume at least the indicated amount of power, the power management system is configured to determine a set of computing devices that will consume an amount of power in excess of the indicated amount of power, the amount of power in excess of the indicated amount of power being based on an expected failure rate of the energy storage devices.

8. The system of claim 6 wherein, to determine the set of the computing devices that will consume at least the indicated amount of power, the power management system is configured to determine a set of computing devices that will consume at least the indicated amount of power based on one or more models of power consumed by the computing devices for a given utilization.

9. A method comprising:
receiving electrical power at a power-consuming facility from an electric utility grid;
storing energy from the received power in at least one energy storage device located at the power-consuming facility comprising multiple energy storage devices configured to store electrical energy from the electrical power received from the electric utility grid and connect to computing devices such that a power management system is able to cause the computing devices to be powered by the energy storage devices;
identifying a collection of the computing devices that are not needed to perform scheduled operations;
determining a first amount of power consumed by the collection of the computing devices;
identifying a collection of the connected energy storage devices that do not need to be recharged;
determining a second amount of power consumed by the collection of the connected energy storage devices;
determining a third amount of power by which power consumed by the power-consuming facility can be reduced based on the first amount and the second amount; and
sending a message based on the determined third amount of power by which power consumed by the power-consuming facility can be reduced.

10. The method of claim 9, further comprising:
receiving an indication of an amount of power; and,
in response to the indication, causing at least a portion of the power-consuming facility to be powered by the at least one energy storage device rather than the power received from the electric utility grid such that an amount of the received power consumed by the power-consuming facility is reduced by at least the indicated amount.

11. The method of claim 10 wherein the indicated amount of power is equal to an amount of power needed to maintain a grid frequency of the electric utility grid at a predetermined value.

12. The method of claim 9 wherein the power-consuming facility is a computer data center.

13. The method of claim 10 wherein causing at least a portion of the power-consuming facility to be powered by the at least one energy storage device rather than the power received from the electric utility grid comprises determining a set of the computing devices that will consume at least the indicated amount of power and causing at least some of the computing devices in the set to be powered by the connected energy storage devices rather than the power received from the electric utility grid.

14. The method of claim 13 wherein determining the set of computing devices that will consume at least the indicated amount of power comprises determining a set of computing devices that will consume an amount of power in excess of the indicated amount of power, the amount of power in excess of the indicated amount of power being based on an expected failure rate of the energy storage devices.

15. The method of claim 13 wherein determining the set of the computing devices that will consume at least the indicated amount of power comprises determining a set of computing devices that will consume at least the indicated amount of power based on one or more models of power consumed by the computing devices for a given utilization.

16. A system comprising:
a power-consuming facility configured to receive electrical power from an electric utility grid;
at least one energy storage device located at the power-consuming facility, the energy storage device comprising multiple energy storage devices configured to store electrical energy from the electrical power received from the electric utility grid and connect to computing devices such that a power management system is able to cause the computing devices to be powered by the energy storage devices; and,
the power management system is configured to:
receive an indication of an amount of power;
determine a set of computing devices that will consume an amount of power in excess of the indicated amount of power, the amount of power in excess of the indicated amount of power being based on an expected failure rate of the energy storage devices; and,
cause at least some of the computing devices in the set to be powered by the connected energy storage devices such that an amount of the received power consumed by the power-consuming facility is reduced by at least the indicated amount.

17. A system comprising:
a power-consuming facility configured to receive electrical power from an electric utility grid;
at least one energy storage device located at the power-consuming facility, the energy storage device comprising multiple energy storage devices configured to store electrical energy from the electrical power received from the electric utility grid and connect to computing devices such that a power management system is able to cause the computing devices to be powered by the energy storage devices; and,
the power management system is configured to:
receive an indication of an amount of power;
determine a computing load of one or more of the computing devices, wherein power consumed by the computing devices varies based on the computing load of the computing devices and the computing load of the computing device varies from an idle computing capacity to a maximum computing capacity;
determine a set of the computing devices that will consume at least the indicated amount of power based on the determined computing loads and one or more models of power consumed by the computing devices for a given computing load; and,
cause at least some of the computing devices in the set to be powered by the connected energy storage devices such that an amount of the received power consumed by the power-consuming facility is reduced by at least the indicated amount.

* * * * *